United States Patent [19]

Paris et al.

[11] 3,976,736

[45] Aug. 24, 1976

[54] SOAP BAR MANUFACTURE

[75] Inventors: Wayne H. Paris, Suffern, N.Y.; Ronald C. Wolfe, Wyckoff, N.J.; Terrence P. Fay, Monroe, N.Y.; Robert D. Lindquist, Loveland, Ohio

[73] Assignee: Avon Products, Inc., Suffern, N.Y.

[22] Filed: Mar. 11, 1974

[21] Appl. No.: 450,210

[52] U.S. Cl. .................. 264/148; 252/370; 264/176 R; 264/210 R; 264/294; 264/330; 264/348

[51] Int. Cl.[2] .................. B29C 17/00; C11D 13/18; C11D 13/22; C11D 13/28

[58] Field of Search .......... 264/348, 237, 148, 151, 264/157, 154, 210, 319, 322, 320, 330, 293, 294, 176 R; 425/289, 299, 305; 252/369–371

[56] References Cited

UNITED STATES PATENTS

| | | | |
|---|---|---|---|
| 2,190,615 | 2/1940 | Thurman | 252/370 |
| 2,373,593 | 4/1945 | Pease | 264/157 |
| 2,709,278 | 5/1955 | Greer | 264/348 |
| 2,988,774 | 6/1961 | Hely | 264/151 |
| 3,089,197 | 5/1963 | Chaffee et al. | 264/148 X |
| 3,823,215 | 7/1974 | D'Arcangeli | 264/148 |

FOREIGN PATENTS OR APPLICATIONS

| | | | |
|---|---|---|---|
| 621,383 | 6/1961 | Canada | 252/370 |

*Primary Examiner*—Willard E. Hoag
*Attorney, Agent, or Firm*—Pennie & Edmonds

[57] ABSTRACT

An improved process and apparatus system for continuously forming soap bars which are resistant to marring during wrapping and packaging thereof comprising cooling shaped soap billets with a cooling fluid at a velocity thereof and for a time sufficient to harden at least the surface of said billets to the degree which resists marring by subsequent wrapping and packaging.

4 Claims, 1 Drawing Figure

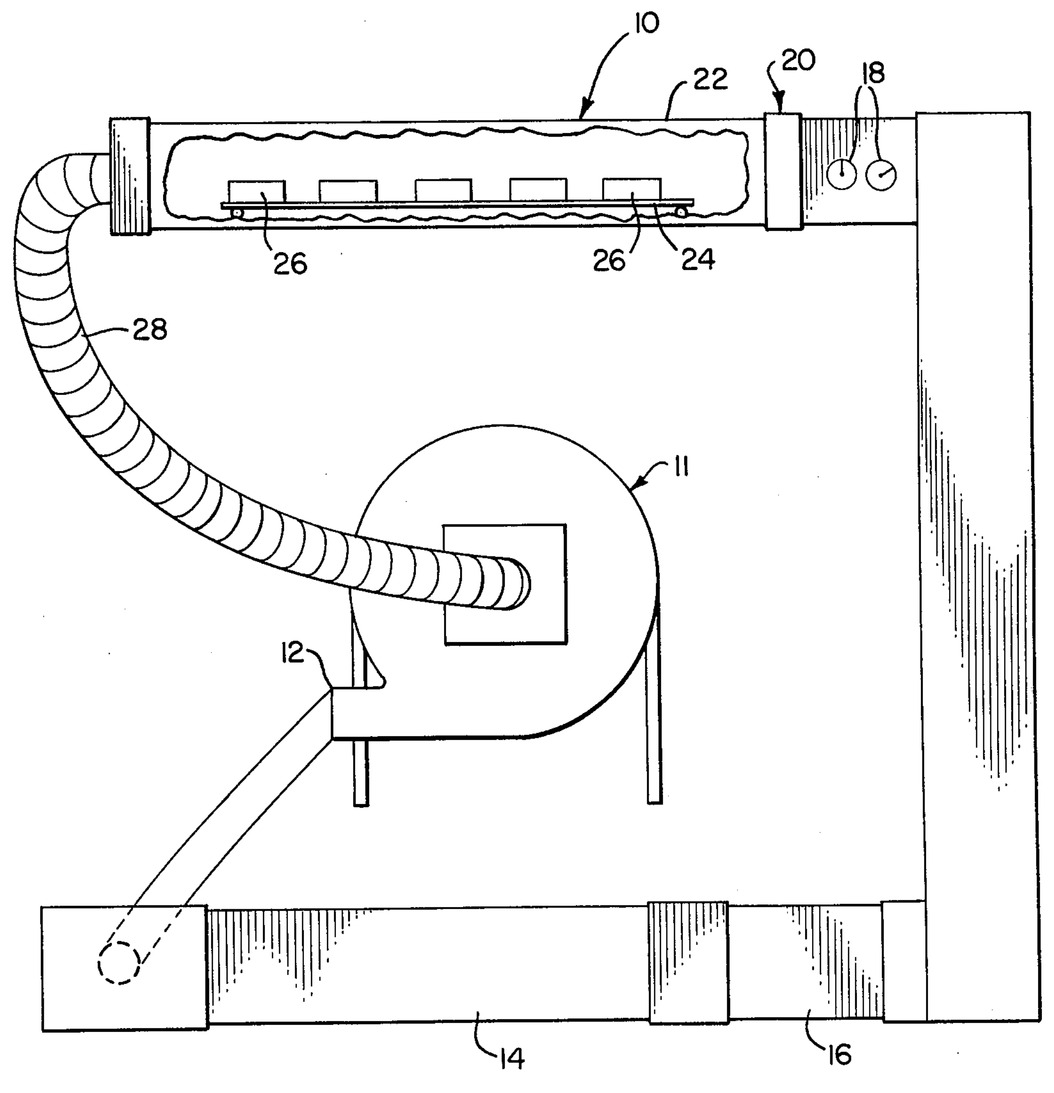
10
20
22
18
26
26
24
28
11
12
14
16

SOAP BAR MANUFACTURE

BACKGROUND OF THE INVENTION

In the manufacture of soap bar compositions, such as toilet soaps, several methods have been employed in forming the bar. One method, for example, involves pouring a molten soap composition into a plate frame or mold and allowing the soap to cool. In another method, one for producing a bar that floats, air is "whipped" into the slightly moist soap composition and it is continuously extruded in the form of a rectangular cross sectional rod or ribbon which is then cut into billets and stamped.

A method which enjoys the most commercial popularity utilizes neat soap as it comes from the production step. It is first mixed with a coloring agent, dried to about an 8–18% moisture content, the dried chips or flakes are passed to a hasher where they are broken up, mixed and finally, extruded in the form of small pellets. The pellets are then passed to another mixer or amalgamator where such ingredients as perfumes, coloring agents, organic liquid additives such as emollients and germicides are added. The added material usually varies from about 1 to 6% of the total ingredients of the composition. The addition of the organic liquid additives acts to plasticize the soap composition by making it softer and more pliable. The amalgamator charge is then fed to a system of screw extruders or plodders which are operated in series to cause intimate mixing and blending of the soap composition. The final extruder produces a continuous rectangularly cross sectioned rod which can be continuously cut into individual billets. Alternate systems have replaced the plodders by a roller-mill for the purpose of mixing and blending the composition and have only one extruder which serves to form the continuous rod of soap composition. The cut billets are then stamped to emboss or deboss the detailed graphics present in the stamped die mold which are to be present in the final soap bar configuration. The stamped billets are then wrapped and packaged and are ready for the consumer.

As stated above, the soap composition which leaves the amalgamator is of a soft and pliable nature. This is a desirable feature for the stamping operation in order that the billet may be free flowing in the die cavity so that it forms the detail graphics present in the die mold. However, this requirement of plasticity is counter to the need for having a hard bar after pressing in order to undergo the subsequent wrapping, packaging, etc. operations without marring. In small scale operations this problem of excessive bar softness has been handled by removing the stamped bars from the line and allowing them to "age" and thereby harden before subsequent operations are carried out. This naturally, is an unacceptable technique wherein a continuous operation is desired and also where minimum handling a processing space is sought.

Modern continuous production lines which wish to alleviate the aging process have installed a conditioning tunnel after the billet cutter and before the stamper in the production line. The rationale behind this is to produce a billet which will be soft enough for stamping yet hard enough to withstand the subsequent operation of wrapping, packaging, etc. The conditioning tunnels which are presently used allow the billet to either age harden or to be subjected to refrigerated air to harden the bar. This technique is undesirable in that it produces a billet which is not easily embossed with the detailed graphics present in the die mold of the stamping process nor is the stamped billet hard enough to undergo subsequent operations without damage.

Thus, the serious quality control problem encountered in modern processing is directed to the deformation and marring of the finished stamped billets due to mechanical action of the wrappers, conveyors, and packers. By making a soap billet hard prior to stamping one does not have a free flowing plastic material which can easily form detailed high quality soap bar materials. Yet, if the soap is allowed to age and become hardened it also becomes more brittle. This brittleness results in fractures in the bar when it is subjected to mechanical impact. Thus, tiny hairline fractures are formed on the bar surface in the stamping operation of hardened soap while white powdery substance forms on the surface of the billet due to the scuffing and banging of the soap by the conveyor system and by the subsequent wrapping and packaging processes.

SUMMARY OF THE INVENTION

It has presently unexpectedly been found that in continuous processes the cooling subsequent to the stamping operation and prior to the wrapping and packaging operations substantially overcomes the problems of deformation and allows the formation of high quality soap bar materials.

The present process comprises subjecting the billets after shaping and prior to wrapping and packaging to a cooling zone wherein the shaped billets are subjected to a cooling fluid at a velocity and for a time sufficient to harden at least the surfaces of said billet to resist marring by subsequent packaging operations. The invention also comprises an improved apparatus system for the continuous manufacture of soap comprising a low temperature, high fluid velocity cooling means positioned between soap stamping means and soap packaging means as will be more fully described below.

DESCRIPTION OF THE DRAWING

The FIGURE is a schematic view of cooling means of the instant invention.

DETAILED DESCRIPTION

The instant invention can readily produce soap bars from ordinary soap compositions, perfumed soap which normally contains approximately 2 to 3% by weight of the total composition of perfume, a high liquid additive soap bar which contains liquid additives such as emollients, germicides, perfumes, etc., of up to about 7% of the total weight of the soap composition, and novelty soaps which contain a relatively low perfume level such as less than 1%. In short, the instant invention is applicable to soap compositions of all types as contrasted with prior continuous systems for forming soap bars which have been designed with respect to the use of a single type of soap composition. It is especially useful with high liquid additive soaps.

In accordance with usual practice the soap material is first mixed in an amalgamator then fed through a system of screw extruders or plodders for intimately mixing the soap composition. The final extruder produces a continuous ribbon of soap which is in turn cut into billets. The billets are normally of a size approximately that of the die mold of the subsequent stamping process. This allows a minimum amount of surplus composition after the stamping operation. The cut billets are then subjected to a stamping operation to emboss and/or deboss the detailed graphics present in the die mold. This stamping operation requires that soap billets be relatively plastic and free flowing so that they can best pick up the details of the die mold of the stamping operation to produce a high quality soap bar configuration.

The billets are, subsequent to the stamping operation, subjected to a cooling fluid in a confined zone at a velocity and for a time sufficient to harden at least the surface of the billet. This case hardening of the surface of the billets is to be sufficient to allow said billets to substantially resist marring during the subsequent packaging steps. It is realized that the term "packaging" as used herein refers to the various steps of wrapping, packing, crating, etc. which are to be done subsequently in the process.

The foregoing steps, save for cooling, are those conventionally used in making soap and the conditions used in the instant invention can be any known and used by those in this art. In like manner the apparatus used for amalgamation, plodding stamping, and packaging can be any used for these purposes.

The essential feature of this invention is the cooling of the soap in relation to the overall process and system for making the bars.

Referring to the drawing there is shown means 10 for cooling the shaped bars subsequent to stamping comprising a blower 11, means 12, such as a damper, in fluid communication with blower 11 for controlling the flow of the fluid from the blower, fluid cooling means 14 (such as a refrigerating unit) which is connected to the fluid flow control, heating means 16 for adjusting the temperature of the fluid, and heat and velocity sensing means 18 which are located at the inlet 20 to the cooling chamber 22. Heating and velocity sensing means 18 are interconnected with the blower 11 and the cooling and heating means 14 and 16 regulate the fluid flow and the inlet temperature of the cooling fluid being used.

Confined cooling chamber 22 contains therein conveyor means 24 upon which shaped soap billets 26 are carried normally in a multipass operation at a speed which allows them to have a desired residence time within cooling chamber 22. Billets 26 enter and exit from the chamber by inlet and outlet ports (not shown) which are of a size to accommodate conveyor 24 and shaped soap billets 26, but are of such size which minimize the loss of cooling fluid from cooling chamber 22. The cooling fluid, preferably a gas such as air, is then returned to the blower by conduit 28 for recycling.

Cooling chamber 22 with refrigerated fluid allows precise control of the cooling conditions and minimizes the space requirement needed. Furthermore, it allows for the initial stamping of a high quality embossed soap bar which can be subsequently wrapped and packaged without marring the details of the bar. The fluid normally used within the cooling system is air although fluids such as nitrogen and the like may be used for special conditions.

It has been found that the cooling requires both temperature and fluid velocity control to obtain the desired degree of surface hardening. The fluid velocity should preferably be between about 20 to about 30 feet per second, and that the inlet temperature of the fluid should be between about 30°F and 40°F. Higher temperatures, although usable, normally require a longer residence time. The normal residence time within the cooling zone of the shaped billets is to be between about 150 seconds to about 270 seconds. The heat load of the cooling unit is normally about 2 tons of refrigeration for a 200 billet per minute continuous system. The air flow pattern is preferably counter current with respect to the billet movement. The cooling means should be of the type which minimizes dirt pick-up on the bars by containing such devices as electrostatic filters and the like which substantially eliminate dirt in the fluid flow.

The preferred conditions for cooling a wide variety of soap compositions to produce a surface which will resist marring by packaging are a fluid velocity of about 30 feet per second; inlet air temperature of about 35°F. and residence time within the confined zone of the cooling means of about 3 minutes.

With certain exotic soap compositions, variations from the disclosed temperature and velocity conditions may be required, but these can be determined empirically by passing billets of such soap through the cooling chamber 22 and determining the optimum conditions giving the necessary hardness for packaging without the need for excessive cooling time.

Having described the invention with particular reference to the preferred form thereof, it will be obvious to those skilled in the art to which the invention pertains after understanding the invention, that various changes and modifications may be made therein without departing from the spirit and scope of the invention as defined by the claims appended hereto.

We claim:

1. In a process for continuously forming soap bars having detailed graphics thereon wherein a soap composition is plodded, formed into a continuous ribbon, billeted, shaped, and packaged; the improvement consisting essentially of cooling said billet after shaping and prior to packaging by subjecting the shaped billets to a cooling gas in a confined zone at a velocity thereof and for a time sufficient to harden at least the surface of said billets to substantially resist marring during subsequent packaging.

2. The improvement according to claim 1 wherein the cooling gas is air.

3. The improvement according to claim 1 wherein the gas velocity is between about 20 to about 30 feet per second, the inlet temperature of said gas is between about 30° to 40°F. and the residence time within said cooling zone of the billet is from about 150 seconds to about 4.5 minutes.

4. The improvement according to claim 3 wherein the gas velocity is about 30 feet per second; inlet air temperature is about 35°F. and the residence time is about 3 minutes.

* * * * *